United States Patent [19]

Kato et al.

[11] 4,245,025

[45] Jan. 13, 1981

[54] TRANSFER SHEET AND PROCESS FOR PREPARATION THEREOF

[75] Inventors: Mamoru Kato; Susumu Yamaura, both of Hirakata; Yasutoki Kamezawa, Kyoto; Tatsuo Aizawa, Osaka, all of Japan

[73] Assignee: Mita Industrial Company Limited, Osaka, Japan

[21] Appl. No.: 940,748

[22] Filed: Sep. 8, 1978

[30] Foreign Application Priority Data

Oct. 13, 1977 [JP] Japan ................................ 52-121877

[51] Int. Cl.[3] ........................ G03G 13/14; B32B 9/04

[52] U.S. Cl. .................................... 430/126; 428/446; 428/500; 428/913; 427/146

[58] Field of Search ................ 427/146; 428/914, 913, 428/446, 500; 96/1.4; 520/320.5; 526/923, 347, 317; 430/126

[56] References Cited

U.S. PATENT DOCUMENTS

| | | | |
|---|---|---|---|
| 1,933,052 | 10/1933 | Fikentscher et al. | 536/329.2 |
| 3,008,851 | 11/1961 | Shimizu et al. | 526/923 |
| 3,166,540 | 1/1965 | Melamed et al. | 520/923 |
| 3,170,901 | 1/1965 | Melamed et al. | 520/923 |
| 4,071,362 | 1/1978 | Takenaka et al. | 96/1.4 |
| 4,074,000 | 2/1978 | Hankee et al. | 428/914 |
| 4,085,245 | 4/1978 | DeVito et al. | 427/146 |
| 4,089,547 | 5/1978 | Blynko et al. | 427/146 |

*Primary Examiner*—Ronald H. Smith
*Assistant Examiner*—Janyce A. Bell
*Attorney, Agent, or Firm*—Sherman & Shalloway

[57] ABSTRACT

A transfer sheet for electrostatically transferring thereon an electrically conductive or electrically semi-conductive toner in electrostatic photography or electrostatic printing, which comprises a substrate and a toner-receiving layer formed on at least one surface of the substrate, which toner-receiving layer contains a composition comprising (A) 100 parts by weight of thermoplastic acrylic-styrene copolymer and (B) 10 to 100 parts by weight of dry method finely divided silica is disclosed.

In this transfer sheet, the electric resistance can be maintained at a high level even under high humidity conditions, and a toner image can be transferred on this transfer sheet at a high transfer efficiency without broadening of contours of the image. This transfer sheet has feel and touch quite similar to those of ordinary paper and is very excellent in graphic characteristics.

11 Claims, No Drawings

TRANSFER SHEET AND PROCESS FOR PREPARATION THEREOF

BACKGROUND OF THE INVENTION (1) Field of the Invention

This invention relates to a transfer sheet and a process for the preparation thereof. More particularly, the invention relates to a transfer sheet for electrostatically transferring an electrically conductive or electrically semi-conductive toner in electrostatic photography or electrostatic printing, and a process for the preparation of such transfer sheet.

More specifically, the invention relates to a transfer sheet having a toner-receiving layer on which an electrically conductive or semi-conductive layer can be transferred at a very high transfer efficiency without broadening of contours of a toner image even under a high humidity condition and which is especially excellent in such properties as the feel and touch and the graphic property, and a process for the preparation of such transfer sheet.

(2) Description of the Prior Arts

As one of dry developers (toners) for developing electrostatic latent images formed by electrostatic photography or the like, a so-called electroconductive or semi-conductive magnetic toner capable of performing development without the aid of a particular carrier is known. As the toner of this type, there have heretofore been used toners formed by dispersing powder of a magnetic material such as triiron tetroxide, if necessary with a conducting agent such as carbon black, into a binder resin and molding the dispersion into granules. As means for improving the electric conductivity in these toners, there have ordinarily been adopted a method in which the amount of the conducting agent incorporated in the magnetic material-binder resin dispersion as increased and a method in which the conducting agent is embedded in the above-mentioned toner particles. By adopting these methods, toner particles are provided with such property that they can be magnetically attracted, and improved electric conductivity is imparted to surfaces of toner particles.

These magnetic toners have an advantage that sharp and clear toner images having a much reduced edge effect can be obtained according to the magnetic brush development method even without use of a magnetic carrier or the like. However, they have a defect that if toner images formed on photosensitive layers for electrostatic photography or electrostatic printing, such as photoconductive layers, are transferred onto copy papers, contours of the transferred images become obscure and no sharp images can be obtained.

More specifically, a toner image formed on a zinc oxide photosensitive layer for use in electrostatic photography or electrostatic printing has a good contrast and a sharp edge, but when this toner image is transferred onto untreated high quality paper which has heretofore been used broadly as the transfer sheet, as illustrated in Comparative Test 2 given hereinafter, not only extreme reduction of the density of the transferred image but also broadening of contours of the image take place, and the image becomes very obscure.

As means for eliminating this defect, Japanese Patent Application Laid-Open Specification No. 117435/75 (Japanese Patent Application No. 13929/74) proposes a method in which an electrically conductive or semi-conductive toner-receiving layer having a volume resistivity of at least $3\times10^{13}$ Ω-cm is formed on at least one surface of a substrate of a transfer sheet, and it is taught that a medium such as a resin, a wax, an oil or fat or an insulating filler is applied to the surface of the substrate for forming such toner-receiving layer. It also is taught that an acrylic resin, a silicone resin, a vinyl acetate resin or an alkyd resin is preferred as the resin to be used for formation of such toner-receiving layer.

Indeed, a transfer sheet having a toner-receiving surface formed by using such resin is advantageous in that a toner image can be transferred without substantial broadening of contours under a relatively low humidity condition. However, this transfer sheet is still insufficient because under a high humidity condition broadening of contours of a toner image is caused at the transfer step and the transfer efficiency is relatively low. This degradation of transfer characteristics under a high humidity condition is especially conspicuous when such resin is applied in the form of an aqueous coating composition. Further, the toner-receiving layer of such resin tends to cause marked reduction of the feed and touch and graphic property of the transfer sheet, and when a pigment or extender pigment customarily used for improving these characteristics is incorporated in such toner-receiving layer, the above-mentioned humidity dependency of the transfer characteristics becomes more conspicuous.

BRIEF SUMMARY OF THE INVENTION

We found that when an acrylic-styrene copolymer is used in combination with dry method finely divided silica for formation of a toner-receiving layer of a transfer sheet, an electrically conductive or semi-conductive toner can be electrostatically transferred onto the toner-receiving layer without degradation of the transfer characteristics owing to the humidity and the feel and touch and the graphic property can be remarkably improved in the resulting transfer sheet.

It is therefore a primary object of this invention to provide a transfer sheet for use in electrostatic photography or electrostatic printing which enables to electrostatically transfer images of an electrically conductive or electrically semi-conductive toner without the above-mentioned defect.

Another object of the invention is to provide a transfer sheet for use in electrostatic photography or electrostatic printing in which the electric resistance on the surface can be maintained at a high level even under high humidity conditions and which enables to electrostatically transfer a toner image formed on a photosensitive layer for electrostatic photography or electrostatic printing at a high transfer efficiency irrespective of the humidity while keeping sharp contours of the image and has improved feel and touch and improved graphic property of the toner-receiving layer.

Still another object of the invention is to provide a process for preparing such transfer sheet for electrostatic photography or electrostatic printing, which comprises forming on a paper substrate a toner-receiving layer having a high electric resistance in which the dependency of the electric resistance on the humidity is much reduced and the feel and touch and the graphic property are remarkably improved, by using an aqueous coating resin composition.

In accordance with one fundamental aspect of this invention, there is provided a transfer sheet for electrostatically transferring thereon an electrically conductive or electrically semi-conductive toner in electrostatic photography or electrostatic printing, which comprises a substrate and a toner-receiving layer formed on at least one surface of said substrate, said toner-receiving layer consisting essentially of a composition comprising (A) 100 parts by weight of a thermoplastic acrylicstyrene copolymer and (B) 10 to 100 parts by weight of dry method finely divided silica.

In accordance with another fundamental aspect of this invention, there is provided a process for preparing a transfer sheet for electrostatically transferring thereon an electrically conductive or electrically semi-conductive toner, which comprises coating on at least one surface of a substrate an aqueous composition containing (A) 100 parts by weight of a thermoplastic acrylic-styrene copolymer in the form of an emulsion, preferably a self-emulsifiable emulsion, and (B) 10 to 100 parts by weight of dry method finely divided silica and drying the coated substrate to form a toner-receiving layer on the surface of the substrate.

DETAILED DESCRIPTION OF THE PREFERRED EMBODIMENTS

As the acrylic monomer that constitutes the thermoplastic acrylic-styrene copolymer that is used in this invention, there can be mentioned (1) ethylenically unsaturated carboxylic acids such as acrylic acid, methacrylic acid, maleic anhydride, fumaric acid, crotonic acid and itaconic acid, (2) esters of these ethylenically unsaturated carboxylic acids such as butyl acrylate, ethyl acrylate and methyl acrylate, and (3) ethylenically unsaturated nitriles such as acrylonitrile and methacrylonitrile. These monomers can be used singly or in the form of a mixture of two or more of them.

As the styrene type monomer that constitutes the thermoplastic acrylic-styrene copolymer, there can be mentioned aromatic vinyl monomers such as styrene, α-methylstyrene and vinyltoluene.

It is important that the thermoplastic acrylic-styrene copolymer that is used in this invention should have an acid value of 10 to 170, preferably 20 to 100. In case of a copolymer having an acid value (mg of KOH necessary for neutralizing 1 g of the copolymer) less than 10, the copolymer has ordinarily no emulsifiable characteristics and it is impossible to attain an effect of rendering the toner-receiving layer substantially insensitive to the humidity while applying the copolymer in the form of an aqueous coating composition. When a copolymer having an acid value larger than 170 is employed, the resulting toner-receiving layer is too sensitive to the humidity and the above-mentioned objects of this invention cannot be attained.

In this invention, it is important that an acrylic-styrene copolymer should be chosen among various acrylic resins and it should be used for formation of a toner-receiving layer. As will readily be understood from Comparative Tests given hereinafter, when an ordinary acrylic resin not containing a styrene type monomer as the constituent monomer is employed, a satisfactory transferred image can be obtained under low humidity conditions but under high humidity conditions broadening of contours of the transferred image is caused and the transfer efficiency tends to decrease. Further, when a styrene type polymer not containing acrylic monomer as the constituent monomer is employed, broadening of contours is caused in a transferred image under not only high humidity conditions but also low humidity conditions, and the transfer efficiency is drastically lowered. In contrast, when a copolymer of an acrylic monomer with a styrene type monomer is used for formation of a toner-receiving layer of a transfer sheet, under not only low humidity conditions but also high humidity conditions a magnetic toner can be transferred at such a high transfer efficiency as 80% or higher without broadening of contours of a transferred image.

It is preferred that the thermoplastic acrylic-styrene copolymer that is used in this invention be a copolymer comprising 4 to 60% by weight of an ethylenically unsaturated carboxylic acid, 10 to 75% by weight of an aromatic vinyl monomer and 0 to 84% by weight of an ester of an ethylenically unsaturated carboxylic acid, especially a copolymer consisting of 4 to 60% by weight of (a) units represented by the following formula:

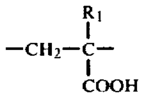

(I)

wherein $R_1$ stands for a hydrogen atom or a lower alkyl group having up to 4 carbon atoms, (b) 10 to 75% by weight of units represented by the following formula:

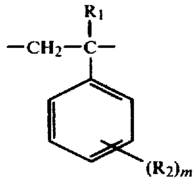

(II)

wherein $R_1$ is as defined above, $R_2$ stands for a lower alkyl group having up to 4 carbon atoms, and m is 0 or 1, and (c) 0 to 86% by weight of units represented by the following formula:

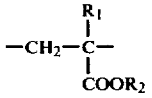

(III)

wherein $R_1$ and $R_2$ are as defined above.

In this invention, the molecular weight of the thermoplastic acrylic-styrene copolymer is not particularly critical, so far as it has a film-forming molecular weight.

Thermoplastic acrylic-styrene copolymers that are preferably used in this invention are marketed under tradenames of "Daika Lac S-1307" and "Vinisol MC-106" (products manufactured and sold by Daido Kasei Kogyo K. K.).

In order to improve the toner-retaining property, graphic characteristics, adaptability to sealing, touch and other properties in the resulting transfer sheet, it is important that the resinous composition for formation of the toner-receiving layer should comprise dry method finely divided silica in an amount of 10 to 100 parts by weight, especially 20 to 50 parts by weight, per 100 parts by weight of the acrylic-styrene copolymer (A). By the term "dry method finely divided silica" used herein is meant ultra-fine particulate silica prepared by decomposing silicon tetrachloride according to the dry method, and it is commercially available under the tradename "Aerosil." This finely divided silica prepared according to the dry method is different from and advantageous over finely divided silica prepared by decomposing sodium silicate or the like according to the wet method, such as so-called white carbon, in the point that the above-mentioned properties such as graphic characteristics and touch can be remarkably enhanced without substantial increase of the humidity dependency of electric characteristics.

Our prior application Ser. No. 831,862, now U.S. Pat. No. 4,168,338 discloses a transfer sheet for electrostatic photography or electrostatic printing which comprises a toner-receiving layer formed on at least one surface of a substrate to transfer thereon an electrically conductive or semi-conductive toner, said toner-receiving layer comprising a composition containing (A) an acrylic polymer having a carboxyl group content of 2 to 30% by weight and (B) a thermosetting resin reactive with said acrylic polymer, such as an epoxy resin.

This transfer sheet has an advantage that a toner image can be transferred at a high transfer efficiency without broadening of contours of the toner image even under high humidity conditions, but some difficulties are involved in the preparation of this transfer sheet. For example, reaction readily takes place between the acrylic polymer and the thermosetting resin such as an epoxy resin in a coating composition prior to the coating operation, and premature gelation is often caused to occur. Accordingly, the storage stability and adaptability to the coating operation are degraded in the coating composition to be used for preparing this transfer sheet.

In contrast, when an acrylic-styrene copolymer is especially selected among acrylic polymers containing free carboxyl groups according to this invention, a transfer sheet provided with a toner-receiving layer excellent in transfer characteristics can be obtained without the use of a thermosetting resin such as an epoxy resin.

Another prominent advantage of this invention is that a toner-receiving layer having a highly electrically insulating property which is hardly influenced by moisture in air can be applied in the form of an aqueous composition.

In general, when a resin is applied in the form of an aqueous composition, there are attained various advantages. For example, an expensive solvent need not be used and troubles such as pollution of air are not caused. However, the resulting resin coating film is highly sensitive to the humidity and its electric characteristics are readily influenced by moisture in air and drastically degraded.

In contrast, according to the present invention, by selecting an acrylic-styrene copolymer among acrylic resins and using it in the form of an aqueous emulsion, it is possible to coat this copolymer in the form of an aqueous composition and also to moderate remarkably the influences of the humidity as described hereinbefore.

It is preferred to use the acrylic-styrene copolymer in the form of a self-emulsifiable emulsion, especially one in which the carboxyl group of the copolymer is present in the form of an ammonium salt. In case of a coating prepared from such especially preferred emulsion, the ammonium component is readily isolated from the copolymer at the drying step or the like, and degradation of electric characteristics by moisture or humidity can be prevented more effectively. Of course, an emulsion of the acrylic-styrene copolymer can be easily prepared by polymerizing the above-mentioned monomers in water in the presence of an anionic emulsifier and/or a non-ionic emulsifier and a water-soluble radical polymerization initiator according to known procedures, and the so prepared emulsion can be used directly for formation of an aqueous coating composition to be used for forming a toner-receiving layer.

In this invention, from the viewpoint of the facility of the coating operation, it is preferred that the acrylic-styrene copolymer be present in an amount of 5 to 40% by weight, especially 5 to 20% by weight, as the resin in the aqueous coating composition.

As the substrate on which a toner-receiving layer is formed, there can be used papers such as cellulose fiber papers, e.g., tissue paper, high quality paper, art paper, tracing paper and raw paper for copying, resin films such as transparent films, matted films and foamed films, synthetic papers prepared from artificial fibers, fabrics such as non-woven fabrics, woven fabrics and knitted fabrics and metals such as metal foils and metal sheets. For ordinary copying, papers are most preferably employed.

Coating of the aqueous composition on the substrate can easily be accomplished by using known coating mechanisms such as an air doctor coater, a blade coater, a rod coater, a knife coater, a squeegee coater, a dip coater, a reverse roll coater, a transfer roll coater, a spray coater and a curtain coater. In the paper-making step, the resinous composition of this invention may be incorporated into pulp together with a sizing agent, clay and the like, or in the paper-making process, the composition may be applied by impregnation or coating using a sizing press or the like.

In this invention, it is preferred that the toner-receiving layer be formed in a dry coat amount of 2 to 20 $g/m^2$, especially 5 to 10 $g/m^2$.

In order to further improve the moisture resistance of the acrylic-styrene copolymer (A) in the resinous composition for formation of the toner-receiving layer, the coated resinous composition may be heated, for example, at 80° to 200° C. for 10 seconds to 5 minutes. This heating treatment may be conducted separately from drying of the coating layer of the aqueous composition on the substrate, but in general, it is advantageous that the heating treatment is conducted simultaneously with drying of the coating layer.

When the coating composition comprises a thermosetting resin in addition to the acrylic-styrene copolymer (A), by the above-mentioned heat treatment, curing reaction between the acrylic-styrene copolymer and the thermosetting resin is simultaneously advanced.

According to this invention, a transfer sheet for electrostatic photography or electrostatic printing having a toner-receiving layer composed of the above-mentioned resinous composition is formed in the foregoing manner. This transfer sheet is advantageously used as a copying paper or printing paper for electrostatically transferring thereon an electrically conductive or electrically semi-conductive toner.

The toner-receiving layer of the transfer sheet of this invention is characterized in that the humidity dependency of electric characteristics is conspicuously reduced. As will be apparent from data shown on Table 1 given hereinafter, in transfer papers comprising a toner-receiving layer of a resin outside the scope of this invention, such as an ordinary acrylic resin, a styrene resin or a vinyl acetate resin, the saturation voltage is lower than 100 V as measured at a temperature of 40° C. and a relative humidity of 100%. In contrast, in the transfer paper of this invention, the saturation voltage is higher than 300 V as measured at a temperature of 40° C. and a relative humidity of 100%.

The "saturation voltage" referred to in the instant specification means an electrostatic potential formed on the surface of the toner-receiving layer when a voltage of −5 KV is applied for 5 seconds to the toner-receiving layer of the sample transfer paper by using, for example, an electrostatic paper analyzer Model SP-428 manufactured by Kawaguchi Denki Seisakusho.

In the transfer sheet of this invention, the saturation voltage retention ratio under high humidity conditions ($R\gamma$), which is defined by the following formula:

$$R\gamma=(V_{100}/V_{40})$$

wherein $V_{40}$ indicates the saturation voltage of the transfer sheet as measured at a temperature of 20° C. and a relative humidity of 40% and $V_{100}$ represents the saturation voltage of the transfer sheet as measured at a temperature of 40° C. and a relative humidity of 100%, is at least 0.7, preferably at least 0.8.

Since the transfer paper of this invention is excellent in electric characteristics of the toner-receiving layer as pointed out above and also since the humidity dependency of these electric characteristics is conspicuously reduced, when an electrically conductive or electrically semi-conductive toner is transferred onto this transfer paper from a photosensitive plate for electrostatic photography or electrostatic printing, very sharp and clear images can always be obtained, and such properties as the graphic property and the touch and feel can be remarkably improved.

In preparing prints according to electrostatic photography using the transfer sheet of this invention, electrically conductive or electrically semi-conductive toner images can be formed according to any of known processes for electrostatic photography.

For example, a photosensitive layer composed mainly of a photoconductor such as zinc oxide, selenium or the like, which is formed on a substrate plate, is charged by corona discharge or the like, and actinic rays are applied imagewise to form an electrostatic image corresponding to the light image on the surface of the photosensitive layer. This electrostatic image is developed by a magnetic brush of an electrically conductive or electrically semi-conductive toner to form a toner image corresponding to the electrostatic image.

As the electrically conductive or electrically semi-conductive toner, there is employed a toner formed by dispersing a fine powder of a magnetic material in a binder medium and, if necessary, imparting electric conductivity to surfaces of particles. Toner particles having a volume resistivity in the range of from $10^2$ to $10^9$ Ω-cm are preferably employed. A typical recipe of such electrically conductive or electrically semi-conductive toner is as follows:

| | |
|---|---|
| Binder (wax, resin or the like) | 30 to 60% by weight |
| Fine powder of magnetic material (triiron tetroxide or the like) | 30 to 60% by weight |
| Conducting agent (carbon black or the like) | 0.5 to 2% by weight |

The electrically conductive or electrically semi-conductive toner image formed in the foregoing manner is then transferred on the transfer paper of this invention. This transfer operation may be performed according to any of known processes. For example, the toner-receiving layer of the transfer sheet of this invention is brought in contact with the electrically conductive or electrically semi-conductive toner image on the photosensitive layer, and a transfer voltage is applied to the back surface of the transfer sheet by corona discharge or the like, whereby transfer of the toner from the photosensitive layer to the transfer paper can be accomplished very easily.

The transferred toner image is tightly fixed by known fixing means, for example, thermal fusion fixing, pressure fixing or the like.

The transfer paper of this invention shows a very high transfer efficiency of 70% or more not only under normal low humidity conditions but also under high humidity conditions such as a relative humidity of 100%, and a fixed image excellent in the density and contrast can be formed on the transfer paper of this invention. Further, the transfer sheet of this invention is comparable to ordinary paper in the graphic characteristics and touch.

This invention will now be described in detail by reference to the following Comparative Tests and Examples.

COMPARATIVE TEST 1

In order to show that the transfer sheet of this invention prepared by using a specific resinous composition comprising an acrylic-styrene copolymer for forming a toner-receiving layer is conspicuously excellent over transfer sheets customarily used with respect to the transfer efficiency, stability under high humidity conditions and broadening-preventing effect, the following test was conducted

[1] Preparation of Transfer Sheets (1—1) Transfer Sheet (A) of This Invention:

A composition having the following recipe was prepared as a coating liquid for forming a toner-receiving layer:

| | |
|---|---|
| Water | 500 g |
| Silica (Aerosil #200 manufactured by Nippon Aerosil K. K.) | 15 g |
| Acrylic-styrene copolymer (Daika Lac S-1307 manufactured by Daido Kasei Kogyo K.K.) | 100 g |

(1-2) Comparative Transfer Sheet (B):

| | |
|---|---|
| Water | 500 g |
| Silica (Aerosil #200 manufactured by Nippon Aerosil K.K.) | 15 g |
| Acrylic resin (Jurymer ET-410 manufactured by Nippon Junyaku K.K.) | 300 g |

(1-3) Comparative Transfer Sheet (C):

| | |
|---|---|
| Water | 500 g |
| Silica (Aerosil #200 manufactured by Nippon Aerosil K.K.) | 15 g |
| Styrene resin (Polymaron 360 manufactured by Arakawa Rinsan | 300 g |

-continued

| |
|---|
| Kagaku Kogyo K.K.) |

(1-4) Comparative Transfer Sheet (D):

| | |
|---|---|
| Water | 500 g |
| Silica (Aerosil #200 manufactured by Nippon Aerosil K.K.) | 15 g |
| Vinyl acetate resin (Movinyl DC manufactured by Hoechst Gosei K.K.) | 150 g |

Each composition was sufficiently dispersed for 5 minutes by means of a homogenizing mixer and was coated on a raw paper for a photosensitive paper (manufactured by Sanyo Kokusaku Pulp K.K.; base weight = 58 $g/m^2$) in a dry coat amount of about 5 $g/m^2$ by a rod bar coater (rod bar diameter = 0.3 mm). The coated base paper was dried at 120° C. for 1 minute to obtain a transfer sheet (A), (B), (C) or (D) for electrostatic photography or electrostatic printing.

(2-3) Stability against Moisture:

(a) Low Humidity (20° C., 40% RH):

Each sample transfer sheet was allowed to stand for 24 hours in a box maintained at a temperature of 20° C. and a relative humidity (RH) of 40%, and immediately, the charge quantity was measured by an electrostatic paper analyzer Model SP-428 manufactured by Kawaguchi Denki Seisakusho under an applied voltage −5 KV. The voltage-applying time was 10 seconds.

(b) High Humidity (40° C., 100% RH):

Each sample transfer sheet was allowed to stand for 5 hours in a moisture test box (manufactured by Tabai Seisakusho) maintained at a temperature of 40° C. and a relative humidity of 100%, and the charge quantity was immediately measured by an electrostatic paper analyzer Model SP-428 manufactured by Kawaguchi Denki Seisakusho under an applied voltage of −5 KV. The voltage-applying time was 10 seconds.

[3] Measurement Results

Results of the above-mentioned tests are shown in Table 1.

TABLE 1

| | Properties of Transfer Sheets | | | | | |
|---|---|---|---|---|---|---|
| | 20° C., 40% RH | | | 40° C., 100% RH | | |
| Sample | Charge Quantity (V) | Transfer Efficiency (%) | Sharpness of Transferred Image | Charge Quantity (V) | Transfer Efficiency (%) | Sharpness of Transferred Image |
| Transfer Sheet (A) | 400 | 90-95 | O | 320 | 80-85 | O |
| Commercial Product (B) | 350 | 90-95 | O | 100 | 20-30 | Δ |
| Commercial Product (C) | 250 | 60-70 | Δ | 50 | 10-20 | X |
| Commercial Product (D) | 250 | 60-70 | Δ | 50 | 10-20 | X |

Note
The sharpness of the transferred image was evaluated according to the following scale:
O: clear and sharp image with no broadening
Δ: low transfer efficiency with slight broadening
X: conspicuous broadening and halation of contours

[2] Measurement Methods (2-1) Transfer Efficiency:

A black image on an original was developed and transferred on each of the foregoing sample transfer sheets by using a toner transfer tester manufactured by Mita Industrial Company (photosensitive plate = zinc oxide, applied voltage = −5 KV), and each sample was evaluated on the transfer efficiency. The transfer efficiency referred to herein is a value calculated according to the following formula:

$$TE\ (\%) = \frac{TT}{RT + TT} \times 100$$

wherein TE stands for the transfer efficiency, TT stands for the amount of the toner transferred on the transfer sheet and RT designates the amount of the toner left on the zinc oxide photosensitive plate after the transfer test.

Incidentally, the quantity of the toner was determined by flowing a solvent (acetone), dissolving out the toner with the solvent and measuring the weight of the toner.

(2—2) Sharpness and Broadening:

The image on the transfer sheet was evaluated by the naked eye observation with respect to the image sharpness and broadening.

[4] Conclusion

As will be apparent from the results shown in Table 1, the transfer sheet (A) according to this invention is prominently excellent over the comparative transfer sheets comprising a toner-receiving layer formed by an ordinary polymer with respect to the transfer efficiency, high stability against high humidity and prevention of occurrence of broadening of contours of the transferred image. The reason is considered to be that the skeleton of styrene units combined with the acrylic monomer units in the copolymer of this invention is prominently excellent in charging characteristics (the charging property is good but the charge-storing property is very low).

Comparative Test 2

In order to show that a transfer sheet prepared according to this invention by using a toner-receiving layer-forming composition comprising a thermoplastic acrylic-styrene copolymer and dry method silica powder is excellent over commercially available transfer sheets with respect to transfer properties such as transfer efficiency, high humidity stability and prevention of broadening, the following test was conducted.

[1] Preparation of Transfer Sheets (1—1) Transfer Sheet (A) of This Invention:

The transfer sheet (A) prepared in Comparative Test 1 was used as a sample of this invention. (1-2) Conventional Transfer Sheets:

The following transfer sheets were tested as conventional transfer sheets.

Commercial product (E): plain paper copying sheet manufactured by Company E

Commercial product (F): plain paper copying sheet manufactured by Company F

Commercial product (G): plain paper copying sheet manufactured by Company G

Raw paper (H) for photosensitive paper: raw paper for diazo-type photosensitive paper manufactured by Company H

[2] Measurement Methods

The foregoing transfer sheets were tested on the transfer efficiency, sharpness, reduction of broadening and stability against high humidity according to the same methods as described in Comparative Test 1.

[3] Measurement Results

Obtained test results are shown in Table 2.

TABLE 2

| | Properties of Transfer Sheets | | | | | |
|---|---|---|---|---|---|---|
| | 20° C., 40% RH | | | 40° C., 100% RH | | |
| Sample | Charge Quantity (V) | Transfer Efficiency (%) | Sharpness of Transferred Image | Charge Quantity (V) | Transfer Efficiency (%) | Sharpness of Transferred Image |
| Transfer Sheet (A) | 400 | 90-95 | O | 330 | 80-85 | O |
| Transfer Sheet (E) | 200 | 60-70 | Δ | 0 | 5-10 | X |
| Transfer Sheet (F) | 100 | 40-50 | Δ | 0 | 5-10 | X |
| Transfer Sheet (G) | 100 | 40-50 | Δ | 0 | 5-10 | X |
| Transfer Sheet (H) | 180 | 60-70 | Δ | 0 | 5-10 | X |

Note
The sharpness of the transferred image was evaluated according to the following scale:
O: clear and sharp image with no broadening
Δ: low transfer efficiency and insufficient sharpness with slight broadening
X: conspicuous broadening and halation of contours

[4] Conclusion

As will be apparent from the foregoing test results, the transfer sheet (A) formed by using a composition comprising a thermoplastic acrylic-styrene copolymer and silica prepared according to the dry method as a coating composition according to this invention show better charging property, higher transfer efficiency and higher sharpness of the transferred image (the appearance of the print) under not only low humidity conditions but also high humidity conditions than conventional transfer sheets.

Comparative Test 3

In order to show that if the amount of dry method silica, which is used for the toner-receiving layer-forming composition of this invention, is too small or too large, transfer characteristics (transfer efficiency, stability against high humidity and feel) are conspicuously changed and also show the criticality of use of dry method silica in an amount specified in this invention, the following test was conducted.

[1] Preparation of Transfer Sheets (1—1) Transfer Sheet (A) of This Invention:

The same transfer sheet (A) as prepared in Comparative Test 1 was used as a sample of this invention.

(1-2) Comparative Transfer Sheet (I) (silica being not used):

A composition having the following recipe was prepared as a coating liquid for forming a toner-receiving layer:

| | |
|---|---|
| Water | 500 g |
| Acrylic-styrene copolymer (Daika Lac S-1307 manufactured by Daido Kasei Kogyo K. K.) | 100 g |

(1-3) Comparative Transfer Sheet (J) (amount of dry method silica being too large):

A composition having the following recipe was prepared as a coating liquid for forming a toner-receiving layer:

| | |
|---|---|
| Water | 500 g |
| Silica (Aerosil #200 manufactured by Nippon Aerosil K.K.) | 100 g |
| Acrylic-styrene copolymer (Daika Lac S-1307 manufactured by Daido Kasei Kogyo K.K.) | 50 g |

(1-4) Comparative Transfer Sheet (K) (amount of dry method silica being too small):

A composition having the following recipe was prepared as a coating liquid for forming a toner-receiving layer:

| | |
|---|---|
| Water | 500 g |
| Silica (Aerosil #200 manufactured by Nippon Aerosil K.K.) | 5 g |
| Acrylic-styrene copolymer (Daika Lac S-1307 manufactured by Daido Kasei Kogyo K.K.) | 100 g |

(1-5) Comparative Transfer Sheet (L) (wet method silica being used):

A composition of the following recipe was prepared as a coating liquid for forming a toner-receiving layer:

| | |
|---|---|
| Water | 500 g |
| Silica (Syloid 244 manufactured by Fuji-Davison Kagaku K.K.) | 30 g |
| Acrylic-styrene copolymer (Daika Lac S-1307 manufactured by Daido Kasei Kogyo K.K.) | 100 g |

(1-6) Comparative Transfer Sheet (M) (clay being used as pigment):

| | |
|---|---|
| Water | 500 g |
| Pigment (Ultra-While 90 manufactured by Engel Hard Co. Ltd.) | 30 g |
| Acrylic-styrene copolymer (Daika Lac S-1307 manufactured by Daido Kasei Kogyo K.K.) | 100 g |

Each composition was sufficiently dispersed by a homogenizing mixer for about 5 minutes and coated on a raw paper for production of a photosensitive paper (manufactured by Sanyo Kokusaku Pulp K.K.; base weight=58 $g/m^2$) in a dry coat amount of about 5 $g/m^2$ by a rod bar coater (the rod bar diameter being 0.3 mm). The coated paper was dried at 120° C. for 1 minute to obtain a transfer sheet (I), (J), (K), (L) or (M) for electrostatic photography or electrostatic printing.

[2] Measurement Methods

The so prepared transfer sheets were tested with respect to the transfer efficiency, sharpness, feel and stability against high humidity according to the same methods as described in Comparative Test 1.

[3] Test Results

Obtained results are shown in Table 3.

TABLE 3

| | Properties of Transfer Sheets | | | | | | |
|---|---|---|---|---|---|---|---|
| | 20° C., 40% RH | | | | 40° C., 100% RH | | |
| Sample | Charge Quantity (V) | Transfer Efficiency (%) | Sharpness of Transferred Image | Feel | Charge Quantity (V) | Transfer Efficiency (%) | Sharpness of Transferred Image |
| Transfer Sheet (A) | 400 | 90-95 | O | O | 330 | 80-85 | O |
| Transfer Sheet (I) | 400 | 90-95 | O | X | 320 | 80-85 | O |
| Transfer Sheet (J) | 400 | 90-95 | O | X | 200 | 50-60 | Δ |
| Transfer Sheet (K) | 400 | 90-95 | O | X | 300 | 80-85 | O |
| Transfer Sheet (L) | 300 | 60-70 | Δ | O | 50 | 10-20 | X |
| Transfer Sheet (M) | 250 | 60-70 | X | O | 30 | 10-20 | X |

Note
(1) The sharpness of the transferred image was evaluated according to the following scale:
O: sharp and clear image with no broadening
Δ: low transfer efficiency with slight broadening
X: halation of contours with extreme broadening
(2) The feel of the transfer sheet was evaluated according to the following scale:
O: paper-like feel
X: no paper-like feel

[4] Conclusion

From the foregoing test results, it will be apparent that the transfer sheet (A) comprising a toner-receiving layer formed by a composition containing as indispensable components an acrylic-styrene copolymer and dry method silica according to this invention has stable transfer characteristics and paper-like touch and feel under both high humidity conditions and low humidity conditions. For example, the transfer sheet (I) having a toner-receiving layer not containing dry method silica, which is one of the indispensable components of the present invention, shows stable transfer characteristics under both high humidity conditions and low humidity conditions, but this is inferior to the transfer sheet (A) of the present invention with respect to the feel and touch. Further, the transfer sheet (L) having a toner-receiving layer containing wet method silica instead of dry method silica and the transfer sheet (M) having a toner-receiving layer containing clay instead of dry method silica have satisfactory paper-like feel but they have a very low transfer efficiency under both high humidity conditions and low humidity conditions, and transferred images are very obscure and satisfactory prints cannot be obtained.

Still further, the transfer sheet (J) having a toner-receiving layer containing too large an amount of dry method silica shows stable transfer characteristics under low humidity conditions but under high humidity conditions the transfer efficiency is reduced because of the moisture-absorbing property of silica and transferred images (prints) are obscure. In this case, the feel of the transfer sheet is degraded.

Still in addition, the transfer sheet (K) having a toner-receiving layer containing too small an amount of dry method silica has stable transfer characteristics under both high humidity conditions and low humidity conditions and provides clear and sharp transferred images, but the transfer sheet is inferior in the feel and touch and comes to have a filmy lustrous surface and no good graphic property can be manifested.

Comparative Test 4

In order to show that when the acid value of the thermoplastic acrylic-styrene copolymer that is used for formation of a toner-receiving layer in this invention is larger than 170, the properties of the resulting transfer sheet are drastically degraded, the following test was carried out.

[1] Preparation of Transfer Sheets (1-1) Transfer Sheet (A) of This Invention:

The same transfer sheet (A) as prepared in Comparative Test 1 was used as a sample of this invention. (1-2) Comparative Trasnfer Sheet (N) (acid value of acrylic-styrene copolymer being larger than 170):

A composition having the following recipe was prepared as a coating for forming a toner-receiving layer:

| | |
|---|---|
| Water | 500 g |
| Silica (Aerosil #200 manufactured by Nippon Aerosil K.K.) | 15 g |
| Acrylic-styrene copolymer (Daika Lac S-1235 manufactured by Daido Kasei Kogyo K.K.) | 100 g |

This composition was sufficiently dispersed for about 5 minutes by means of a homogenizing mixer and coated on a raw paper for production of a photosensitive paper (manufactured by Sanyo Kokusaku Pulp K.K.; base weight = 58 $g/m^2$) in a dry coat amount of about 5 $g/m^2$ by using a rod bar coater (the rod bar diameter being 0.3 mm). The coated paper was dried at 120° C. for 1 minute to obtain a transfer sheet (N) for electrostatic photography or electrostatic printing).

[2] Measurement Methods

The so prepared transfer sheets were tested with respect to the transfer efficiency, sharpness and stability against high humidity according to the methods described in Comparative Test 1.

[3] Test Results

Obtained test results are shown in Table 4.

TABLE 4

| Sample | Properties of Transfer Sheets: 20° C., 40% RH: Charge Quantity (V) | Transfer Efficiency (%) | Sharpness of Transferred Image | 4° C., 100% RH: Charge Quantity (V) | Transfer Efficiency (%) | Sharpness of Transferred Image |
|---|---|---|---|---|---|---|
| Transfer Sheet (A) | 400 | 90-95 | O | 330 | 80-85 | O |
| Transfer Sheet (N) | 350 | 80-85 | O | 150 | 20-30 | Δ |

Note
The sharpness of the transferred image was evaluated according to the following scale:
O: sharp and clear image with no broadening
Δ: low transfer efficiency with halation of contours

[4] Conclusion

From the foregoing test results, it will readily be understood that when a thermoplastic acrylic-styrene copolymer having an acid value larger than 170, the transfer characteristics are not changed under low humidity conditions, but under high humidity conditions, the transfer efficiency is degreaded because the charging property of the resin per se is low owing to a high carboxyl group content and transferred images (prints) become obscure.

EXAMPLE 1

A composition having the following recipe was prepared as a coating liquid for forming a toner-receiving layer:

| | |
|---|---|
| Water | 500 g |
| Silica (Aerosil #200 manufactured by Nippon Aerosil K.K.) | 30 g |
| Acrylic-styrene copolymer (Vinysol MC-106 manufactured by Daido Kasei Kogyo K.K.) | 300 g |

This composition was sufficiently dispersed for about 5 minutes by a homogenizing mixer and was coated on a raw paper for production of a photosensitive paper (manufactured by Sanyo Kokusaku Pulp K.K.; base weight = 58 $g/m^2$) in a dry coat amount of about 5 $g/m^2$ by a rod bar coater (the rod bar diameter being 0.3 mm). The coated paper was dried at 120° C. for 1 minute to obtain a transfer sheet for electrostatic photography or electrostatic printing. When an original image was reproduced and transferred on this transfer sheet by using a toner transfer tester manufactured by Mita Industrial Company (photosensitive plate = zinc oxide; applied voltage = −5 KV), a sharp and clear image with no broadening was obtained at a transfer efficiency of 95%.

EXAMPLE 2

In the same manner as described in Example 1, a transfer sheet was prepared by using Aerosil #380 (dry method silica manufactured by Nippon Aerosil K.K.) instead of the dry method silica used in Example 1 (Aerosil #200 manufactured by Nippon Aeroisl K.K.). The transfer operation was conducted on this transfer sheet in the same manner as described in Example 1. Results similar to the results obtained in Example 1 were obtained.

EXAMPLE 3

The same composition as prepared in Example 1 was sufficiently dispersed for about 5 minutes by a homogenizing mixer and was coated on a raw paper for production of a photosensitive paper (manufactured by Sanyo Kokusaku Pulp K.K., base weight = 58 $g/m^2$) in a dry coat amount of about 5 $g/m^2$ by an air knife coater and the coated paper was dried to form a toner-receiving layer on one surface of the paper. In the same manner as described above, the above coating composition was coated on the other surface of the paper in a dry coat amount of about 5 $g/m^2$ and the coated paper was dried to obtain a transfer sheet for electrostatic photography or electrostatic printing having a toner-receiving layer on each surface. In the same manner as described in Example 1, the transfer operation was conducted on both the surfaces of this transfer sheet. Obtained results were similar to the results obtained in Example 1.

EXAMPLE 4

A composition having the following recipe was prepared as a coating liquid for forming a toner-receiving layer:

| | |
|---|---|
| Water | 500 g |
| Silica (Aerosil #200 manufactured by Nippon Aerosil K.K.) | 30 g |
| Acrylic-styrene copolymer (Vinysol MC-106 manufactured by Daido Kasei Kogyo K.K.) | 300 g |
| Epoxy resin (Denacol EX-832 manufactured by Nagase Sangyo K.K.) | 30 g |

In the same manner as described in Example 1, this composition was coated and dried to obtain a transfer sheet for electrostatic photography or electrostatic printing. The transfer operation was conducted on this transfer sheet in the same manner as described in Example 1 to obtain results similar to the results obtained in Example 1.

EXAMPLE 5

A composition having the following recipe was prepared as a coating liquid for forming a toner-receiving layer:

| | |
|---|---|
| Water | 500 g |
| Silica (Aerosil #130 manufactured by Nippon Aerosil K.K.) | 30 g |
| Acrylic-styrene copolymer (Daika Lac S-1307 manufactured by Daido Kasei Kogyo K.K.) | 100 g |

This composition was sufficiently dispersed for about 5 minutes by a homogenizing mixer and coated on one surface of a raw paper for production of a photosensitive paper (manufactured by Sanyo Kokusaku Pulp K.K., base weight=58 $g/m^2$) in a dry coat amount of about 5 $g/m^2$ by a rod bar coater (the rod bar diameter being 0.3 mm). The coated paper was dried at 120° C. for 1 minute to obtain a transfer sheet for electrostatic photography or electrostatic printing.

Separately, a composition having the following recipe was prepared as a back surface-coating liquid:

| | |
|---|---|
| Water | 300 g |
| Pigment (Ultra-white 90 manufactured by Engel Hard Co. Ltd.) | 50 g |
| Acrylic resin (Movinyl DC manufactured by Hoechst Gosei K. K.) | 60 g |
| Electrically conductive resin (ECR-34 manufactured by Dow Chemical Co. Ltd.) | 50 g |

This coating composition was coated on the back surface of the above transfer sheet in a dry coat amount of about 5 $g/m^2$ by a rod bar coater (the rod bar diameter being 0.3 mm), and the coated sheet was dried to obtain a transfer sheet for electrostatic photography or electrostatic printing having a toner-receiving layer. In the same manner as described in Example 1, the transfer operation was conducted on the toner-receiving layer of this transfer sheet. Obtained results were similar to the results obtained in Example 1.

What we claim is:

1. A transfer sheet for electrostatically transferring thereon an electrically conductive or electrically semiconductive toner in electrostatic photography or electrostatic printing, which comprises a paper substrate and a toner-receiving layer formed on at least one surface of said paper substrate, said toner-receiving layer consisting essentially of a mixture of (A) 100 parts by weight of a thermoplastic acrylic-styrene copolymer having an acid value from 10 to 170 and (B) 20 to 50 parts by weight of dry method finely divided silica.

2. A transfer sheet as set forth in claim 1 wherein the thermoplastic acrylic-styrene copolymer has an acid value of from 20 to 100.

3. A transfer sheet as set forth in claim 1 wherein said thermoplastic acrylic-styrene copolymer (A) is a copolymer of an acrylic-type monomer and a styrene-type monomer, wherein said copolymer is composed of 4 to 60% by weight of an ethylenically unsaturated carboxylic acid as said acrylic-type monomer, 10 to 75% by weight of an aromatic vinyl monomer as said styrene-type monomer and 0 to 84% by weight of an ester of an ethylencially unsaturated carboxylic acid as a third co-monomer.

4. A transfer sheet as set forth in claim 1 wherein said acrylic-styrene copolymer is a copolymer composed of (a) 4 to 60% by weight of units represented by the following formula:

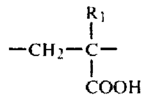

wherein $R_1$ stands for a hydrogen atom or a lower alkyl group having up to 4 carbon atoms, (b) 10 to 75% by weight of units represented by the following formula:

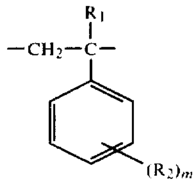

wherein $R_1$ is as defined above, $R_2$ stands for a lower alkyl group having up to 4 carbon atoms, and m is 0 or 1, and (c) 0 to 86% by weight of units represented by the following formula:

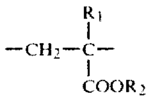

wherein $R_1$ and $R_2$ are as defined above.

5. In an electrostatic photographic process which comprises providing an electrostatic image on a surface of a photosensitive layer comprising a photoconductor, developing the electrostatic image by a magnetic brush of an electrically conductive or electrically semi-conductive toner to form a toner image, transferring said toner image onto a transfer sheet and fixing the toner image on the transfer sheet, the improvement wherein said transfer sheet comprises a paper substrate and a toner-receiving layer formed on at least one surface of said paper substrate, said toner-receiving layer consisting essentially of a mixture of (A) 100 parts by weight of a thermoplastic acrylic-styrene copolymer having an acid value from 10 to 170 and (B) 10 to 100 parts by weight of dry method finely divided silica, said mixture being applied in the form of an aqueous coating composition.

6. A process as set forth in claim 5 wherein the thermoplastic acrylic-styrene copolymer has an acid value of from 20 to 100.

7. A process as set forth in claim 5 wherein said acrylic-styrene copolymer is a copolymer composed of:

(a) 4 to 60% by weight of units represented by the following formula:

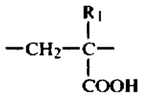

wherein $R_1$ stands for a hydrogen atom or a lower alkyl group having up to 4 carbon atoms;

(b) 10 to 75% by weight of units represented by the following formula:

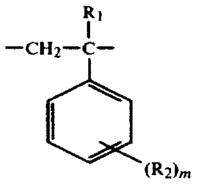

wherein $R_1$ is as defined above, $R_2$ stands for a lower alkyl group having up to 4 carbon atoms, and m is 0 or 1; and (c) 0 to 86% by weight of units represented by the following formula:

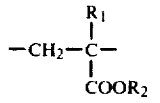

wherein $R_1$ and $R_2$ are as defined above.

8. A process as set forth in claim 5 wherein said transfer sheet has a saturation voltage retention ratio under high humidity conditions ($R\gamma$) of at least 0.7, which is defined by the following formula:

$$R\gamma = V_{100}/V_{40}$$

wherein $V_{40}$ indicates the saturation voltage of the transfer sheet as measured at a temperature of 20° C. and a relative humidity of 40% and $V_{100}$ represents the saturation voltage of the transfer sheet as measured at a temperature of 40° C. and a relative humidity of 100%.

9. A process as set forth in claim 5 wherein said transfer sheet is obtained by coating on at least one surface of the substrate an aqueous composition containing (A) 100 parts by weight of the thermoplastic acrylic-styrene copolymer and (B) 10 to 100 parts by weight of dry method finely divided silica, said copolymer having the carboxylic group in the form of an ammonium salt and being present in the form of a self-emulsifiable emulsion, and drying the coated substrate to form a water-resistant toner-receiving layer on the surface of the substrate.

10. The process as set forth in claim 5 wherein there are from 20 to 50 parts by weight of dry method finely divided silica per 100 parts by weight of thermoplastic acrylic-styrene copolymer.

11. The process as set forth in claim 5 wherein the thermoplastic acrylic-styrene copolymer is a copolymer of an acrylic-type monomer selected from the group consisting of acrylic acid methacrylic acid, maleic anhydride, fumaric acid, crotonic acid and itaconic acid with a styrene-type monomer selected from the group consisting of sytrene, α-methylstyrene and vinyltoluene.

* * * * *